Aug. 7, 1934.  N. J. MIANO  1,969,024
LIQUID METER
Filed June 10, 1932   3 Sheets-Sheet 2
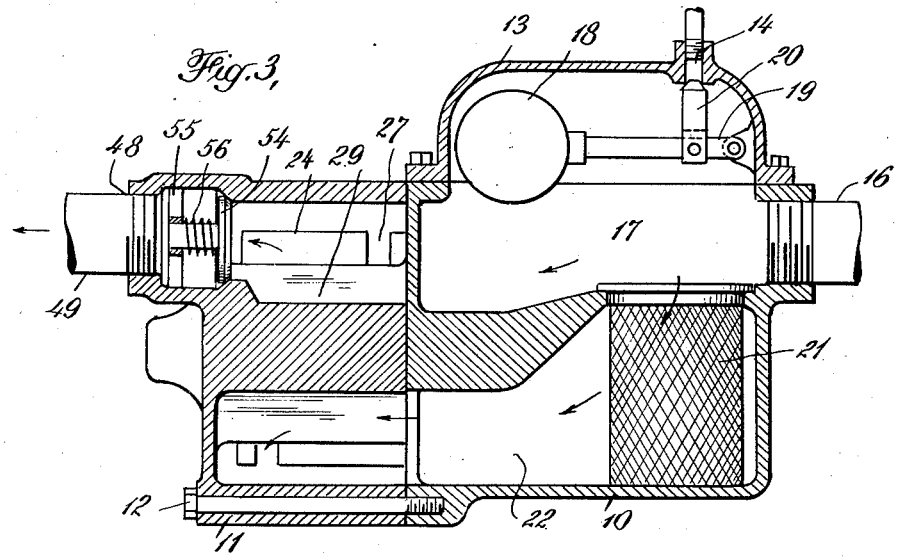
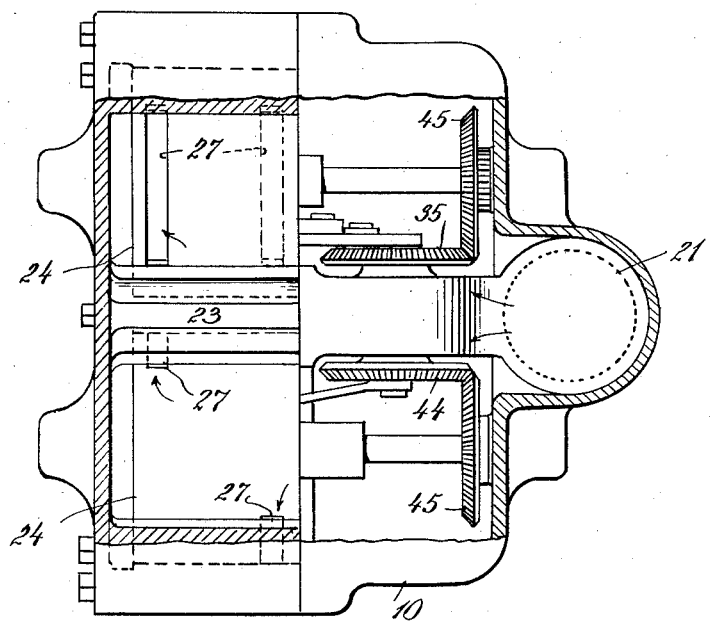
INVENTOR
Nicholas J. Miano
BY
Pennie Davis Marvin Edmonds
ATTORNEYS Aug. 7, 1934.  N. J. MIANO  1,969,024
LIQUID METER
Filed June 10, 1932  3 Sheets-Sheet 3
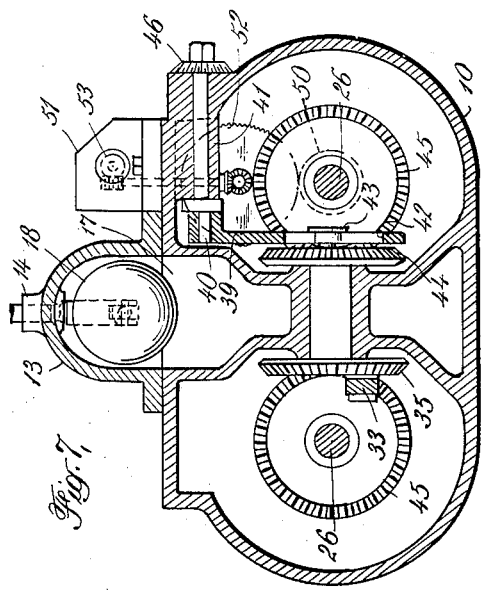
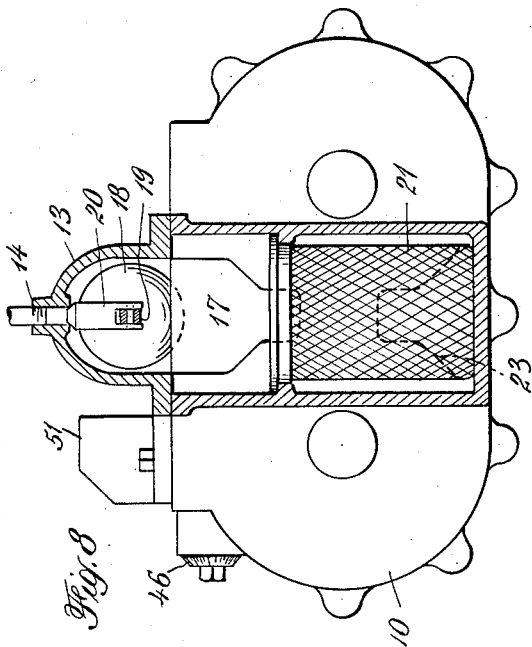
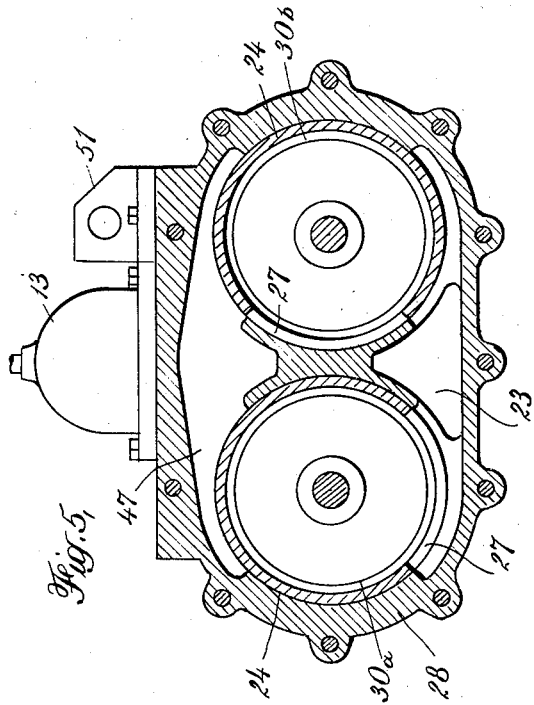
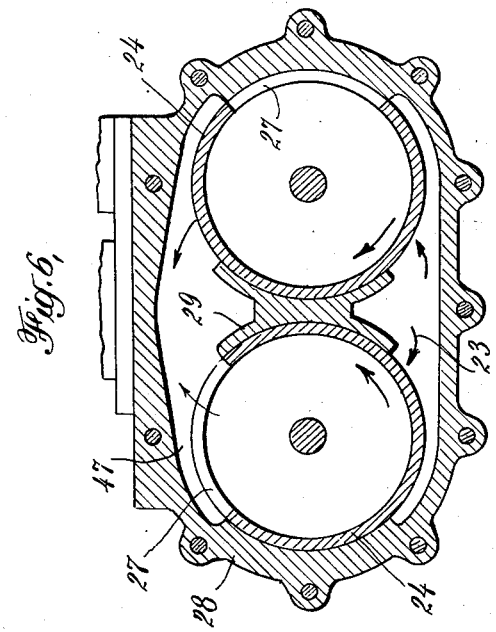
INVENTOR.
Nicholas J. Miano
BY
Pennie Davis Marvin Edmonds
ATTORNEYS Patented Aug. 7, 1934

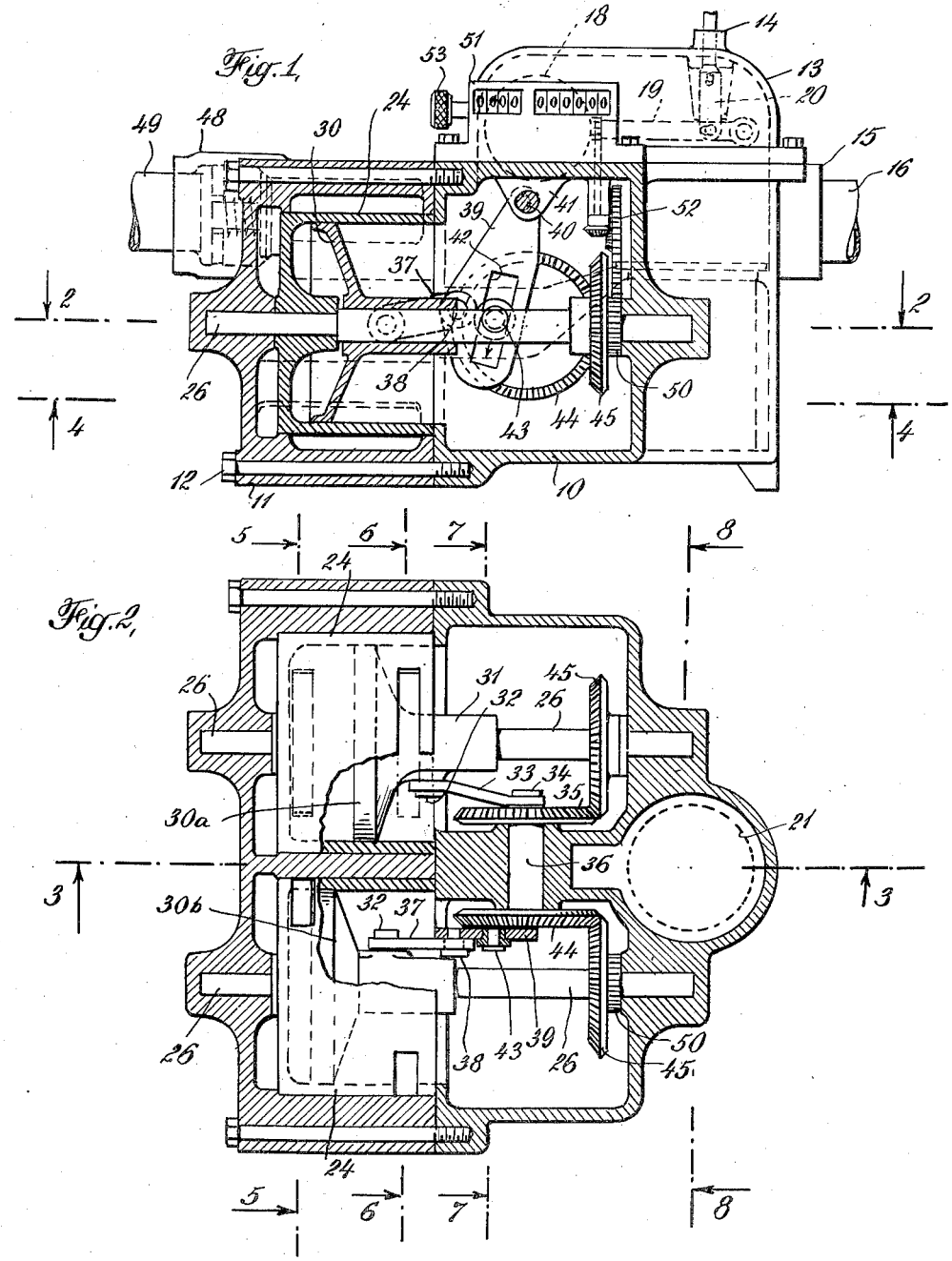

1,969,024

UNITED STATES PATENT OFFICE 1,969,024

LIQUID METER

Nicholas J. Miano, Bronx, N. Y.

Application June 10, 1932, Serial No. 616,409

10 Claims. (Cl. 73—30)

This invention relates to liquid measuring devices or meters of the type in which the liquid flowing through the apparatus under pressure or by gravity operates mechanism which measures and registers or indicates the amount of liquid. More particularly, the invention is concerned with a novel liquid meter which is a complete self-contained unit, so that it may be substituted for a length of piping and which functions efficiently for long periods of time. The new meter interposes little resistance to the free flow of liquid and it contains adjustable means by which it may be regulated to give accurate measurements of liquids of different kinds.

For a better understanding of the invention, reference may be made to the accompanying drawings, in which Fig. 1 is a longitudinal sectional view through the device;

Fig. 2 is a sectional view on the line 2—2 of Fig. 1;

Fig. 3 is a sectional view on the line 3—3 of Fig. 2;

Fig. 4 is a sectional view on the line 4—4 of Fig. 1; and

Figs. 5, 6, 7 and 8 are sectional views on the lines 5—5, 6—6, 7—7 and 8—8 respectively, of Fig. 2.

Referring now to the drawings, the meter in the form illustrated comprises a closed housing which is made up of a main body 10, which is preferably a casting, a hollow extension 11 secured to the end of the main body in any convenient way as by bolts 12, and a hollow cover 13 open to the interior of the housing and provided with a vent 14. The main body is provided with an inlet 15 into which may be threaded the end of a pipe 16, and liquid flowing through the inlet enters a central chamber 17 at the top of the main body. Within the cover is a ball float 18 mounted on arm 19 pivoted on the cover at any convenient place and this arm operates a valve 20 which controls the vent. When the chamber 17 contains liquid at the proper level, the float is raised and the valve is closed, but when the liquid level within the housing falls, the float descends and opens the valve so as to connect the interior of the housing to the atmosphere.

At the bottom of the chamber 17 is an opening in which is mounted a strainer 21 of conventional construction, and liquid flowing through the inlet passes through the strainer and then enters a passage 22 in the bottom of the housing. Since the liquid enters at the side of chamber 17 and leaves at the bottom at a point near the point of admission, turbulence in the liquid occurs in the chamber and this results in an improved separation of the air from the liquid, the air then escaping through the vent 14. The strainer removes foreign matter from the liquid and prevents scale, dirt, and other similar material from reaching the actuating mechanism of the device. The liquid flowing through passage 22 leaves the main body of the housing and enters a continuation 23 of the passage which lies between a pair of cylinders 24 within the extension 11. In the meter illustrated, there are two cylinders lying side by side, and each cylinder is mounted on a shaft 26 which is supported in suitable bearings in the end wall of the main housing and the end wall of the extension. Each cylinder is provided with a pair of ports 27, one near each end, and each port extends around the cylinder for substantially 90°, the two ports in a cylinder being offset 180°. The ports in one cylinder are offset 90° from those in the other for a purpose presently to be described. Each cylinder is mounted to lie with its outer surface in contact with a portion 28 of the extension wall and a partition 29 which forms one wall of the passage 23 between the cylinders.

Within each of the cylinders is a piston 30 which fits snugly against the inner wall of the cylinder and is mounted for free movement on the shaft carrying the cylinder, each piston being movable within its cylinder between the two ports therein. Each piston has a hub 31 through which shaft 26 passes and one of the pistons 30a has a pin 32 on its hub to which is attached a connecting rod 33, the other end of the rod being connected to a pin 34 eccentrically mounted on the face of a beveled gear 35 fast on a shaft 36 extending transverse to the shafts 26 and lying between them. The other piston 30b has a similar pin 32 on its hub to which is attached a connecting rod 37, the other end of which is attached to a pin 38 on a plate 39 pivotally mounted on a pin 40 in an ear 41 depending from the top of the main body of the housing. The plate 39 has a slot 42 through which passes a pin 43 on a bevel gear 44 fast on shaft 36 and gears 35 and 44 mesh with gears 45 on the two shafts 26. The pin 40 on which the plate 39 is mounted extends out through the wall of the housing and carries a dial 46 on its outer end. That part of the pin on which the plate 39 is mounted is offset from the remainder of the pin which passes through the ear 41. Accordingly, when the pin is rotated, the center about which the plate 39 pivots may be shifted toward and away from the piston to which the plate is connected. This varies the length of the travel of the piston and regulates the amount of liquid passing through the device for each reciprocation of the piston. The extent of shifting of the plate 39 is indicated by the dial 46 which may be calibrated in any desired units.

Liquid which enters the passage 23 between the cylinders reaches the interior of the cylinders through the ports therein. With the device in the condition shown in Fig. 5, the front port 27 of the left hand cylinder, as viewed in that figure, is open to the passage while a blank portion of the other cylinder prevents liquid from entering it. Liquid cannot enter the rear portion of either cylinder because of the passage being closed thereto by blank portions of the cylinder walls. The liquid entering the left-hand cylinder fills the space between the end of the cylinder and the front face of the piston 30a, and the pressure of the liquid or its gravity head causes the piston 30a to move back from the end of the cylinder. In this movement, the piston causes a rotation of the shaft 36 and that movement is in turn imparted to shafts 26 causing the cylinders to rotate. When the cylinders have made a quarter turn from the position shown in Fig. 5, the front port of the right-hand cylinder opens to the passage and liquid enters that cylinder and forces back the piston 30b, the movement of this piston assisting in rotating shaft 36 and shafts 26. When another quarter turn of the cylinders has been completed, the front port of the left-hand cylinder (Fig. 5) reaches the top while the back port is now open to passage 23. Liquid then enters the cylinder to the rear of piston 30a and starts to move that piston forward. Liquid in front of the piston is forced out through the front port, and enters a passage 47 at the top of the housing extension, this passage having an outlet 48 into which piping 49 may be threaded.

In the operation of the device, the flow of liquid causes the pistons to reciprocate and this in turn causes the cylinders to rotate. In the rotation of the cylinders, liquid is admitted, first, into the spaces between the faces of the piston and the ends of the cylinders successively and thereafter liquid enters the cylinders back of the pistons successively. The movements of the pistons causes liquid which has previously entered the cylinders, either in front or to the rear of the pistons, to be forced out into the outlet chamber 47. The movement of the pistons causing a rotation of shaft 36 is used to actuate an indicating or registering device and, for this purpose, one of the shafts 26 carries a gear 50 which drives an indicator or register 51 through suitable gearing generally designated 52, the indicator being provided with the customary resetting handle 53. The plate 39 through which piston 30b drives its gear 44 provides a means for regulating the travel of the piston, the shifting of the pivot of this plate varying the throw of the piston. This permits a fine adjustment of the meter to compensate for differences in the character of the liquids being measured, for wear, etc.

The vent 14 permits the meter housing to be freed of air, when the liquid level therein falls, and, without such an air release, the meter might register liquid when air was passing through it. When the meter is to be used for measuring liquids under pressure, a back pressure control valve 54 may be placed in the outlet, this valve being mounted in any convenient manner, as for example, in a spider 55 in the outlet opening. The valve is maintained against its seat by a spring 56.

The air vent serves the further purpose of preventing the meter housing from being emptied of liquid by siphonic action, the fall of the float opening the vent and breaking the siphon. In the construction illustrated, the cover and vent serve merely as an air release device but by increasing the inner volume of the cover, the latter with its vent may also serve as an air separator.

It will be seen that the new meter is a complete self-contained unit and may be installed in a pipe line to replace a length thereof. The meter contains a strainer which prevents particles of dirt and other foreign matter from reaching the pistons and also has an air release device in the inlet side of the apparatus to prevent air from actuating the pistons. Return flow of air into the housing through the outlet line is prevented in pressure installations by means of the check valve. The pistons and cylinders are of light construction so that they interpose little resistance to the flow of liquid and the device may thus be operated under gravity head as well as under pressure.

I claim:

1. A liquid meter which comprises a closed housing having an inlet and an outlet for liquid, a piston in the path of the liquid passing through the housing from the inlet to the outlet, said piston being movable by the liquid, a cylinder within which the piston reciprocates, said cylinder having ports at opposite sides of the piston angularly displaced around the cylinder, means connecting the piston and cylinder for causing rotation of said cylinder by the reciprocation of said piston and means for releasing air entering the housing to the atmosphere, said means being disposed between said inlet and said cylinder.

2. A liquid meter which comprises a closed housing having an inlet and an outlet for liquid, a cylinder within the housing mounted for rotation, said cylinder having a pair of ports one near each end with said ports angularly displaced around said cylinder, a piston within said cylinder movable between said ports, said piston being reciprocated by the liquid passing through said housing, connections for driving said cylinder from said piston, a vent from the housing, said vent being disposed between said inlet and said cylinder and means responsive to the level of the liquid in said housing for opening and closing said vent.

3. A liquid meter which comprises a closed housing having an inlet and an outlet for liquid, a pair of rotatable cylinders mounted side by side in said housing, each cylinder having a port near each end, the ports in each cylinder being angularly offset, a piston in each cylinder movable between said ports, means including a shaft connected to both pistons to be rotated thereby, indicating mechanism actuated by said means, a passage from the inlet to the outside of said cylinders, the rotation of each cylinder bringing said ports into position to permit flow of liquid from said passage into said cylinder alternately on opposite sides of the piston therein, and a passage leading from said cylinders to said outlet.

4. A liquid meter which comprises a closed housing having an inlet and an outlet for liquid, a pair of rotatable cylinders mounted side by side in said housing, each cylinder having a port near each end, the ports in each cylinder being angularly offset, a piston in each cylinder movable between said ports, means including a shaft connected to both pistons to be rotated thereby, indicating mechanism actuated by said means, a passage from the inlet to the outside of said cylinders, the rotation of each cylinder bringing said ports into position to permit flow of liquid from said passage into said cylinder alternately on opposite sides of the piston therein, a strainer in said passage, and a passage leading from said cylinders to said outlet.

5. A liquid meter which comprises a closed housing having an inlet and an outlet for liquid, a pair of rotatable cylinders mounted side by side in said housing, each cylinder having a port near each end, the ports in each cylinder being angularly offset, a piston in each cylinder movable between said ports, means including a shaft connected to both pistons to be rotated thereby, indicating mechanism actuated by said means, a passage from the inlet to the outside of said cylinders, the rotation of each cylinder bringing said ports into position to permit flow of liquid from said passage into said cylinder alternately on opposite sides of the piston therein, a vent from the top of said housing between said inlet and said cylinders and means within the housing responsive to the liquid level therein for opening and closing said vent.

6. A liquid meter which comprises a closed housing having an inlet and an outlet for liquid, a pair of rotatable cylinders mounted side by side in said housing, each cylinder having a port near each end, the ports in each cylinder being angularly offset, a piston in each cylinder movable between said ports, a shaft mounted for rotation, connections between each piston and said shaft for rotating said shaft as said pistons reciprocate, at least one of said connections being adjustable to permit the travel of the piston to be varied, connections between said shaft and said cylinders for causing said cylinders to be rotated by said shaft, and indicating means driven by said shaft.

7. A liquid meter which comprises a closed housing having an inlet and an outlet for liquid, a pair of rotatable cylinders lying side by side within said housing, each cylinder having a port near each end, said ports being angularly offset, a piston movable in each cylinder between the ports thereof, connections between said pistons and cylinders for causing said cylinders to be rotated by the movement of said pistons, a passage leading from the inlet to the outside of said cylinders at one side thereof, a passage leading to the outlet from the outside of said cylinders at the opposite side thereof, a vent from said housing on the inlet side of said cylinders, and means responsive to the liquid level within said housing for opening and closing said vent.

8. In a liquid meter, a cylinder, said cylinder having a port near each end, said ports being angularly offset, a piston within the cylinder actuated by liquid flowing through the meter, a shaft, an indicating device, connections for driving said device from said shaft, means for driving said shaft from said piston including a connecting rod attached to said piston, a pivoted arm to which said connecting rod is attached, driving connections between said arm and said shaft for causing the swinging of said arm to rotate said shaft, means connecting said shaft and cylinder for causing said cylinder to be rotated by rotation of said shaft, and means for shifting the pivot point of said arm to vary the travel of said piston.

9. In a liquid meter, a cylinder, said cylinder having a port near each end, said ports being angularly offset, a piston within the cylinder actuated by liquid flowing through the meter, a shaft, an indicating device, connections between said shaft and device for causing said device to be driven by said shaft, means for driving said shaft from said piston including a connecting rod attached to said piston, a pivoted arm to which said connecting rod is attached, said arm having an opening, a disc on said shaft carrying an eccentric pin, said pin passing through said opening in said arm, and means for shifting the pivot point of said arm to vary the travel of said piston, and means connecting said cylinder and shaft for causing said cylinder to be rotated by said shaft.

10. A liquid meter which comprises a closed housing having an inlet and an outlet for liquid, a turbulence chamber within the housing and into which said inlet leads, a vent for the escape of air from said turbulence chamber, a cylinder within said housing having ports, one near each end and angularly offset, a piston within the cylinder in the path of the liquid flowing from said chamber to said outlet, and means connecting said piston and cylinder for causing said cylinder to be rotated by reciprocation of said piston.

NICHOLAS J. MIANO.